United States Patent
Srivastava

(10) Patent No.: US 10,521,939 B2
(45) Date of Patent: Dec. 31, 2019

(54) SYSTEM, METHOD AND RECORDING MEDIUM FOR PROCESSING MACRO BLOCKS FOR OVERLAY GRAPHICS

(71) Applicant: Analog Devices Global Unlimited Company, Hamilton (BM)

(72) Inventor: Himanshu Srivastava, Gorakhpur (IN)

(73) Assignee: ANALOG DEVICES GLOBAL UNLIMITED COMPANY, Hamilton (BM)

( * ) Notice: Subject to any disclaimer, the term of this patent is extended or adjusted under 35 U.S.C. 154(b) by 527 days.

(21) Appl. No.: 13/896,105

(22) Filed: May 16, 2013

(65) Prior Publication Data

US 2014/0340422 A1  Nov. 20, 2014

(51) Int. Cl.
*G06T 11/60* (2006.01)

(52) U.S. Cl.
CPC .................. *G06T 11/60* (2013.01)

(58) Field of Classification Search
None
See application file for complete search history.

(56) References Cited

U.S. PATENT DOCUMENTS

| | | | |
|---|---|---|---|
| 5,774,133 A * | 6/1998 | Neave ................. | G06T 17/00 345/441 |
| 5,991,515 A * | 11/1999 | Fall ...................... | G06T 9/00 358/1.12 |
| 6,396,473 B1 * | 5/2002 | Callahan et al. ........... | 345/530 |
| 6,584,479 B2 * | 6/2003 | Chang et al. ............... | 715/205 |
| 6,744,533 B1 * | 6/2004 | Easwar et al. ............. | 358/1.9 |
| 7,190,353 B2 * | 3/2007 | Cheng ................. | G06F 3/0488 345/156 |
| 7,400,328 B1 | 7/2008 | Ye et al. | |
| 7,477,205 B1 * | 1/2009 | de Waal ............... | G06F 3/1431 345/1.1 |
| 8,036,433 B1 * | 10/2011 | Wolff .................. | G06K 9/00174 382/119 |
| 8,126,046 B2 | 2/2012 | Chiu et al. | |
| 8,411,094 B2 | 4/2013 | Falchetto et al. | |
| 8,416,241 B2 * | 4/2013 | Diril ................... | G06T 11/40 345/419 |
| 8,792,135 B2 | 7/2014 | Miyata | |
| 2002/0180742 A1 * | 12/2002 | Hamid ................. | G06T 15/005 345/531 |

(Continued)

FOREIGN PATENT DOCUMENTS

JP  2011-77697  4/2011

OTHER PUBLICATIONS

Notice of Preliminary Rejection issued in Korean Patent Application Serial No. 10-2014-0038639 dated Jul. 23, 2015, 4 pages.

(Continued)

*Primary Examiner* — Kee M Tung
*Assistant Examiner* — Patrick F Valdez
(74) *Attorney, Agent, or Firm* — Patent Capital Group

(57) ABSTRACT

An apparatus includes a processing unit that divides an overlay buffer into a plurality of macro blocks, draws a graphic primitive object including a plurality of pixels, identifies one of the plurality of macro blocks upon a determination that the plurality of pixels has crossed a boundary of the one of the plurality of macro blocks, and image processes the one of the plurality of macro blocks.

21 Claims, 5 Drawing Sheets

(56) References Cited

U.S. PATENT DOCUMENTS

| | | | |
|---|---|---|---|
| 2002/0191851 A1 | 12/2002 | Keinan | |
| 2006/0212455 A1* | 9/2006 | Perry | G06F 17/30265 |
| 2006/0274088 A1* | 12/2006 | Dublin et al. | 345/660 |
| 2008/0238880 A1* | 10/2008 | Miwa | G06F 3/0416 |
| | | | 345/173 |
| 2010/0156916 A1 | 6/2010 | Muikaichi et al. | |
| 2011/0148892 A1* | 6/2011 | Shreiner | G06T 11/40 |
| | | | 345/545 |
| 2011/0148923 A1* | 6/2011 | Sadowski | G06F 1/3225 |
| | | | 345/634 |
| 2011/0164038 A1* | 7/2011 | Jung et al. | 345/420 |
| 2011/0216969 A1* | 9/2011 | Chu | G06K 9/36 |
| | | | 382/166 |
| 2012/0293545 A1* | 11/2012 | Engh-Halstvedt et al. | 345/629 |
| 2013/0076762 A1* | 3/2013 | Heggelund | G06T 1/20 |
| | | | 345/502 |

OTHER PUBLICATIONS

English Summary of Notice of Preliminary Rejection issued in Korean Patent Application Serial No. 10-2014-0038639 dated Jul. 23, 2015, 4 pages.

Office Action issued in DE Patent Application Serial No. 102014106672.3 dated Dec. 6, 2016, 6 pages + English translation, 12 pages.

\* cited by examiner

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG. 2a

| 0 | 0 | 0 | 0 | 0 | 0 |
|---|---|---|---|---|---|
| 0 | 1 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG. 2b

| 0 | 0 | 0 | 0 | 0 | 0 |
|---|---|---|---|---|---|
| 0 | 1 | 0 | 0 | 0 | 0 |
| 0 | 1 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG. 2c

| 0 | 0 | 0 | 0 | 0 | 0 |
|---|---|---|---|---|---|
| 0 | 1 | 0 | 0 | 0 | 0 |
| 0 | 1 | 1 | 0 | 0 | 0 |
| 0 | 0 | 1 | 0 | 0 | 0 |
| 0 | 0 | 0 | 0 | 0 | 0 |
| 0 | 0 | 0 | 0 | 0 | 0 |

FIG. 2d

SYSTEM, METHOD AND RECORDING MEDIUM FOR PROCESSING MACRO BLOCKS FOR OVERLAY GRAPHICS

TECHNICAL FIELD

This disclosure relates in general to the field of 2D graphics and, more particularly, to processing an overlay containing a primitive object.

BACKGROUND 2D graphics are used to overlay video frames with primitives such as text. For example, a news program might include a video of a news presenter overlayed with a news crawl scrolling across the top or bottom of the screen.

In an implementation, a graphics system processes an original video to superimpose the text thereon. The original video is initially stored in a video buffer. The system then draws the text on an overlay having the same size as the video buffer. The system processes the text and the video to output the video with the superimposed news crawl.

In one display mechanism, the entire display areas of the overlay and the video buffers are processed at this time. Further, another display mechanism uses a macro block-based technique in which, after an entire graphic primitive object is drawn, a marking is done to indicate the macro blocks to be processed. The marking is performed by first determining the minimum rectangle that covers the entirety of the primitive. The mechanism then marks all the macro blocks that are part of the minimum rectangle. Thus, if a line is drawn from the top left of a display screen to the bottom right of the display screen, the mechanism will mark all of the macro blocks because the minimum rectangle covering the line constitutes the entire display screen. Later, during a display function of this mechanism, the marked macro blocks are processed.

OVERVIEW

In a 2D graphics engine, the operation of drawing a primitive consumes comparatively few cycles of the graphics system. In contrast, the displaying operation takes most of the cycles because it involves bringing the data from an off-chip memory to an on-chip memory, processing it, and then sending the processed data back to the off-chip memory.

In an exemplary embodiment of the present disclosure, only those macro blocks in which a primitive is actually drawn are marked for processing. The present disclosure can thereby optimize the processing cycle by reducing the display and clearing cycles for graphics primitives. The saving can be as high as 80% in many cases.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 2A-2D are simplified diagrams illustrating the marking of macro blocks during the drawing phase in accordance with one embodiment;

DETAILED DESCRIPTION OF EXAMPLE EMBODIMENTS

An apparatus is provided in one example and includes a processing unit configured to divide an overlay buffer into a plurality of macro blocks, to draw a graphic primitive object including a plurality of pixels, to identify one of the plurality of macro blocks upon a determination that the plurality of pixels has crossed a boundary of the one of the plurality of macro blocks, and to image process the one of the plurality of macro blocks.

In a particular embodiment, the processing unit is further configured to proceed to a next one of the plurality of macro blocks without image processing a current one of the plurality of macro blocks, if it is determined the plurality of pixels does not cross a boundary of the current one of the plurality of macro blocks.

In a specific implementation, the processing unit is further configured to identify one of the plurality of macro blocks that contains an initial pixel of the graphic primitive object.

In a further embodiment, the processing unit is configured to retrieve data of the one of the plurality of macro blocks and store the data in an on-chip memory before the image processing, and to send the data of the one of the plurality of macro blocks from the on-chip memory to an off-chip memory after the image processing.

In an additional embodiment, the processing unit is configured to update a bit corresponding to the one of the plurality of macro blocks in a variable and to perform the image processing on the one of the plurality of macro blocks upon a determination based on the bit in the variable.

In some embodiments, the image processing is defined by at least one of a blending and a color conversion.

In a further implementation, the processing unit is configured to determine which one of a plurality of macro blocks of a video plane corresponds to the one of the plurality of macro blocks of the overlay prior to the image processing.

EXAMPLE EMBODIMENTS

Figure 1:
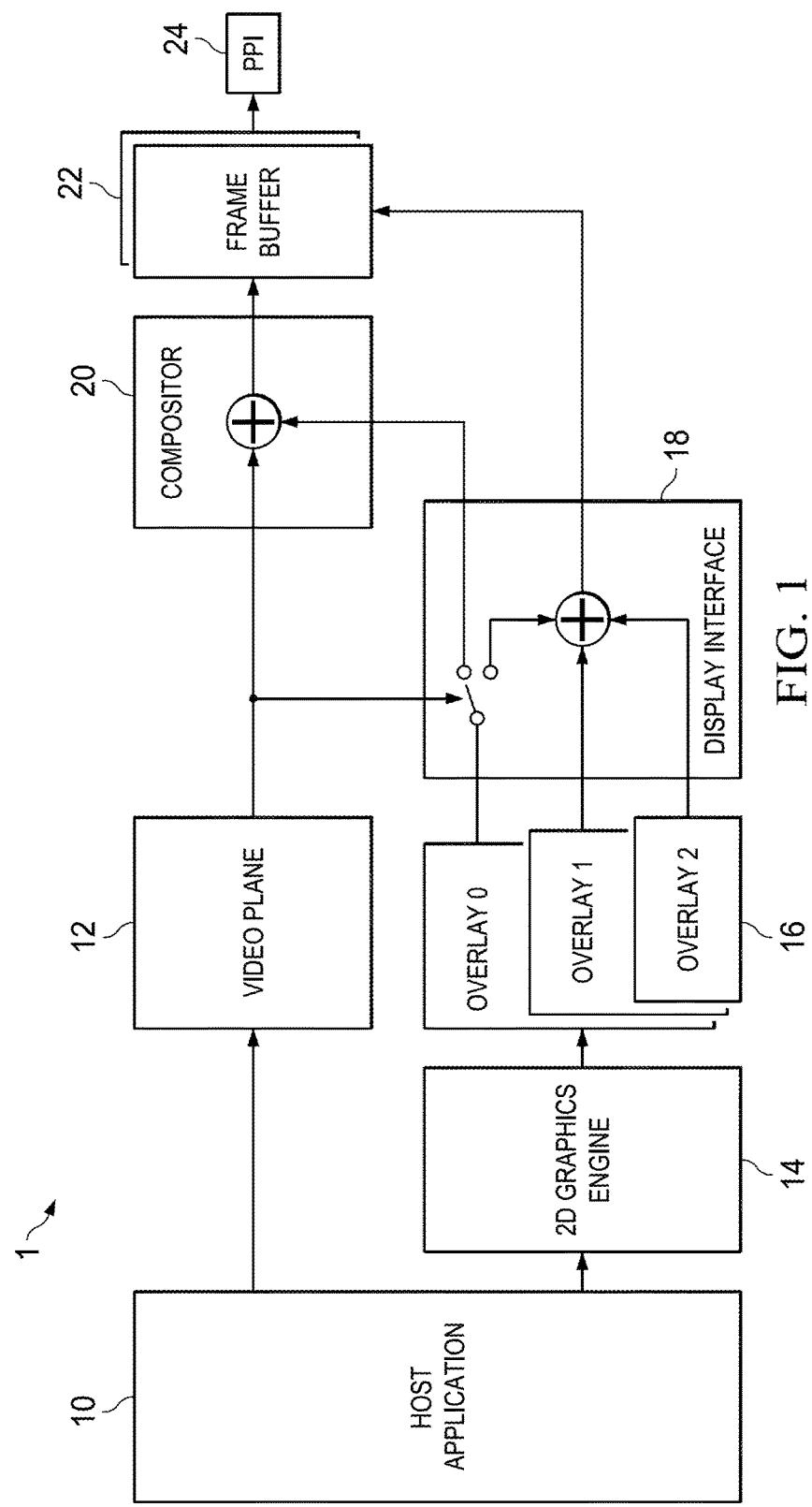
FIG. 1 is a simplified schematic diagram of a video processing system in accordance with one embodiment.

Turning to FIG. 1, that FIGURE illustrates a video processing system 1 in accordance with one embodiment. The video processing system 1 includes a host application 10, a video plane 12, a two-dimensional (2D) graphics engine 14, one or multiple overlay(s) 16, a display interface 18, a compositor 20, a frame buffer 22, and a Parallel Peripheral Interface (PPI) 24.

The host application 10 is executed, for example, on a personal computer (PC) (not shown). In one embodiment, the PC is a general purpose computer including one or multiple processors. The PC also includes memory elements, such as a read-only memory (ROM), a random access memory (RAM), a hard drive, a CD-RW drive, a flash memory, and so on. Such memory elements are examples of storing means.

The PC also includes a network interface, such as a modem or other device for connecting to an intranet, the Internet, a local area network (LAN), or a wide area network (WAN). The network interface may function wirelessly or through a wire or cable. In addition, the PC includes input devices, such as a mouse or keyboard. The PC may include a camera that captures the video to be processed. Further, the PC includes a display device, such as a cathode ray tube (CRT) screen, a liquid crystal display (LCD), and an organic light-emitting diode (OLED) screen. Such display devices are examples of a display means. Of course, other technologies can be used. In addition, the PC is not limited to a general purpose computer and can instead be embodied as a specially programmed apparatus, e.g., a computer in an automobile, a feature phone, a smartphone, or a video game system.

Returning to the host application 10, that application uses a software library incorporating a later described drawing phase and display phase. The host application 10 outputs video data to the video plane 12 for the display phase. The video plane 12 is divided into macro blocks, as described later.

Further, the host application 10 outputs data to the 2D graphics engine 14 for the drawing phase. The 2D graphics engine 14 draws the primitive on one of one or multiple overlay(s) 16. Although overlay 0 is chosen by default, the graphics system is configurable in this regard. Thus, the author of the host application can choose the overlay buffer on which the primitive is drawn.

The overlay(s) 16 are embodied in one or multiple memory buffers. Although it is possible to have multiple overlays, this disclosure generally refers to a single overlay 16.

The overlay 16 outputs information to a display interface 18. The display interface 18, as well as the video plane 12, output information to a compositor 20. The display interface 18 and the compositor 20 perform the processing, e.g., color conversion and blending, of the macro blocks from the video plane 12 and the overlay 16. The compositor 20 outputs the processed video blocks to a frame buffer 22. The frame buffer 22 outputs information to the PPI 24. The PPI 24 is a port that connects to output video devices, such as an LCD or other display. The PPI is an example of an interfacing means.

The video plane 12, the 2D graphics engine 14, the overlay 16, the display interface 18, the compositor 20, and the frame buffer 22 can be embodied in a single digital signal processor (DSP) chip. The DSP chip includes an internal on-chip memory. This on-chip memory is smaller and faster than the RAM in the PC. The DSP is an example of a processing means.

The host application 10 gives a command, by way of the PC, to the graphics system 1 to draw and display a certain graphic primitive object. In one embodiment, this command is given by way of a command file written inside the code of the host application. Thus, the command file is read from the host application through a Universal Serial Bus (USB). The command file contains information regarding the primitive, the location at which to draw the primitive, and the choice of overlay 16. The primitive is drawn on the chosen overlay in the drawing phase discussed later.

FIGS. 2A-2D are simplified diagrams illustrating the marking of macro blocks during the drawing phase in accordance with one embodiment. FIGS. 2A-2D show an exemplary division of a graphics plane into 36 macro blocks. Generally, the size of the macro blocks dictates the number of macro blocks, rather than the reverse. Although both the overlay 16 and the video plane 12 are graphics planes that are so divided, the present description generally pertains to only the division of the overlay.

FIG. 2A shows an initialization phase of the macro blocks of the graphics plane. Each macro block in the graphics plane has an attribute associated with that macro block. In the display phase described later, the attribute indicates whether the block is to be processed, e.g., color converted and blended, or not.

In the initialization phase, all the attributes indicate that no macro block is to be processed and are reset, e.g., set to zero. In an alternative embodiment, the attributes are set to one, yet still indicate no macro block is to be processed.

Although FIG. 2A shows the attributes within the macro blocks, the attributes are not necessarily part of the macro block data structure. For example, in a preferred embodiment, an attribute is a single bit in a variable stored independently of the macro block data structure. In an exemplary embodiment, the variable is 16 bits long and therefore contains bits corresponding to the attributes of 16 macro blocks. Naturally, the system is not limited to using a single 16-bit variable and can use multiple variables. In addition, other lengths, such as 32 or 64 bits, are possible. In the case shown in FIGS. 2A-2D, three 16-bit variables are used to reflect the 36 different macro blocks.

Turning to FIG. 2B, that FIGURE illustrates the beginning of the primitive drawing on the overlay. In this example, the drawing of the primitive begins in the macro block that is second from the top and second from the left in the overlay. As discussed later, when the primitive drawing starts, the attribute of the macro block containing the starting point of the primitive is set, e.g., to one. Thus, if the first bit, i.e., least significant bit, of the first 16-bit variable corresponds to the macro block beginning at the top left corner of the overlay, an exemplary value of the first 16-bit variable at this time would be 0x0080. The setting of the attribute indicates the macro block is to be processed during the later described display phase.

Advancing to FIG. 2C, that figure illustrates a progression of the primitive drawing from the macro block that is second from the top and second from the left in the overlay to the macro block that is third from the top and second from the left in the overlay. When the drawing of the primitive crosses the boundary of the initial macro block to reach the next macro block, the attribute of that next macro block is set, e.g., to one. An exemplary value of the first variable at this time would be 0x2080.

FIG. 2D illustrates a further progression of the primitive drawing. Here, the primitive has extended from the macro block third from the top and second from the left, through the macro block third from the top and third from the left, to the macro block fourth from the top and third from the left. Thus, at this time, the value of the first variable would be 0x6080, and the value of the second variable, which is associated with the second 16 macro blocks, would be 0x0010.

Figure 3:
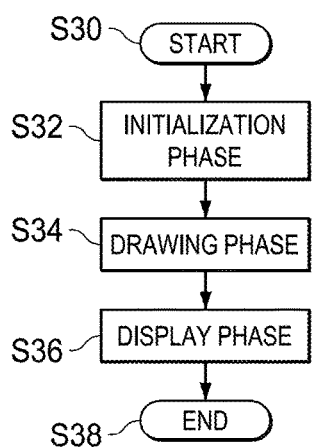
FIG. 3 is a simplified flowchart illustrating an overall operation of a video processing system in accordance with one embodiment.

FIG. 3 is a simplified flowchart illustrating an overall operation of the video processing system 1 in accordance with one embodiment. In particular, FIG. 3 illustrates three phases implemented by the video processing system 1. The flowchart begins at S30 and proceeds to an initialization phase S32. In the initialization phase S32, the overlay is divided into macro blocks, as shown in FIG. 2. In one implementation, the macro blocks are of a 16×16 pixel size. Other sizes, such as 8×8 pixels or 32×32 pixels, are possible. In an exemplary initialization phase S32, the attributes of the macro blocks are cleared, e.g., the bits are set to zero. This initial state indicates no macro block is to be processed during the display phase S36.

After the initialization phase S32 is completed, the 2D graphics engine 14 performs the later described drawing phase S34 on the overlay 16. After the drawing phase S34 is completed, the display phase S36 is performed. In the display phase S36, the compositor 20 receives video macro blocks from the video plane 12 and macro blocks from the overlay 16, by way of the display interface 18. In this way, the display interface 18 and the compositor 20 perform the operations of the later described display phase S36. The phases end at S38.

Figure 4:
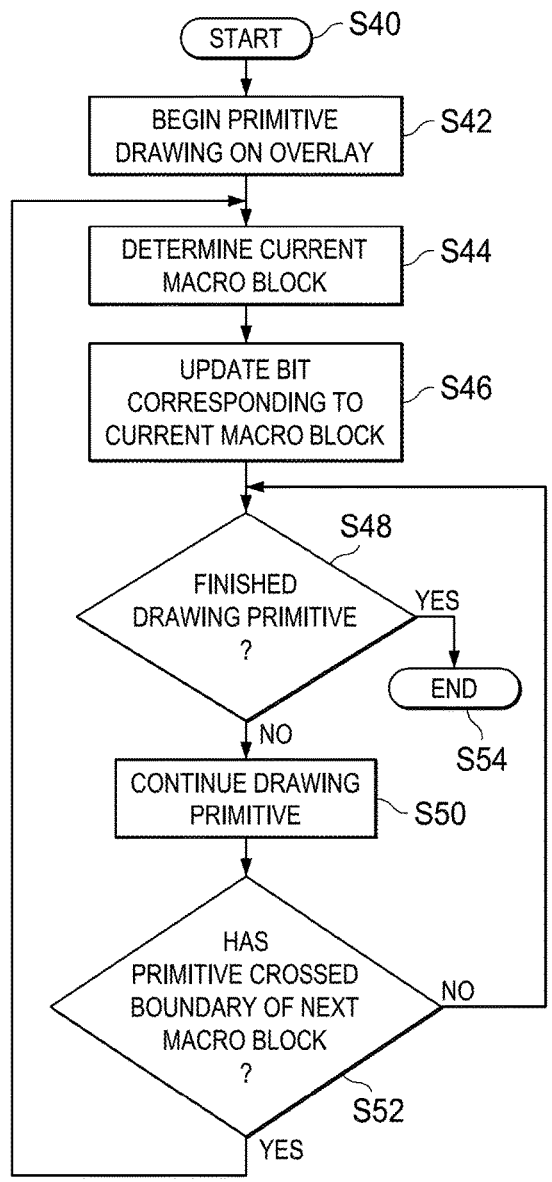
FIG. 4 is a simplified flowchart illustrating a drawing phase of a video processing system in accordance with one embodiment.

FIG. 4 is a simplified flowchart illustrating the drawing phase S34 of the video processing system 1 in accordance with one embodiment. The drawing phase begins at S40 once the graphics system 1 receives a command to draw a primitive. Then, the system starts drawing the primitive at a pixel on the chosen overlay 16 at S42. Algorithms are used at S42 to dictate where to draw the pixels of the primitive.

The macro block in which the first pixel is drawn is then determined at S44. The macro block can be determined based on a coordinate of the first pixel and the size of the macro blocks in the overlay plane. The coordinates of the first pixel are known from the drawing at S42. The size of the macro blocks dictates how many macro blocks are in each column and each row of the video plane. Thus, the division of the video plane into the dictated number of macro blocks determines the coordinates of the boundaries of the macro blocks within the overlay. The offsets of the boundaries of the macro blocks are determined from a predetermined origin, such as from the top left corner of the overlay. Thus, by comparing the coordinates of the first pixel to the locations of the boundaries of the macro blocks, the macro block in which the primitive is being drawn can be determined.

Subsequently, the attribute of that macro block is set in S46. In an embodiment in which the attributes are stored as bits in a variable, the bit corresponding to that macro block is set, e.g., to 1, at S46. The system 1 then determines at S48 whether it has finished drawing the primitive.

If the system 1 has not finished drawing the primitive, the system 1 continues drawing the next pixel of the primitive at S50. Subsequently, the system determines at S52 whether the primitive has crossed a boundary between macro blocks. Although it is possible to check whether the primitive has crossed a boundary of any macro block of the video plane, in one embodiment, only those macro block boundaries surrounding the previous pixel location are checked. In either case, if a macro block boundary has been crossed, the system returns to the macro block determination at S44. If a macro block boundary has not been crossed, the system returns to the completion determination at S48.

When the system determines in S48 that it has finished drawing the primitive, the drawing phase ends at S54.

Other embodiments of the drawing phase S34 are possible. For example, the boundary crossing determination at S52 can be replaced or supplemented by a predictive determination of the next macro block to be entered into by the primitive. This predictive determination can be employed when, for example, a portion of the primitive is linear, such as in the case of a rectangle or triangle, as opposed to curved.

This predictive determination can also be employed upon a determination of the end points of the primitive. For example, if the primitive is a convex polygon, then the determined end points, in combination with the coordinates of the first pixel, are sufficient to determine the boundaries of the macro blocks that must be crossed to draw the primitive.

In another example of a predictive determination, the size of the primitive is applied. In such a case, if the coordinates of a pixel and the size of the primitive are such that the primitive will not extend across a boundary into another macro block, the system can determine that the current macro block is the last one in which the primitive will be drawn. In such a scenario, it becomes unnecessary to repeatedly check if a boundary has been crossed.

Thus, by applying the shape, the end points, and size, along with the current pixel coordinates, the system can employ a predictive determination of which attributes to set.

As discussed above, in one embodiment, the system only checks those macro block boundaries surrounding the previous pixel location to determine whether a macro block boundary has been crossed. The system can further reduce the number of boundaries checked, based on the direction in which the primitive is being drawn. This direction can either be provided by the algorithm for drawing the primitive or by a relative displacement of a pixel from a preceding pixel. For example, if the primitive is directed downward and to the right, it is possible to reduce the number of boundaries being checked to two: the boundary below the current pixel and the boundary to the right of the current pixel.

Because these modifications reduce the number of determinations required, these modifications can result in faster processing times.

Figure 5:
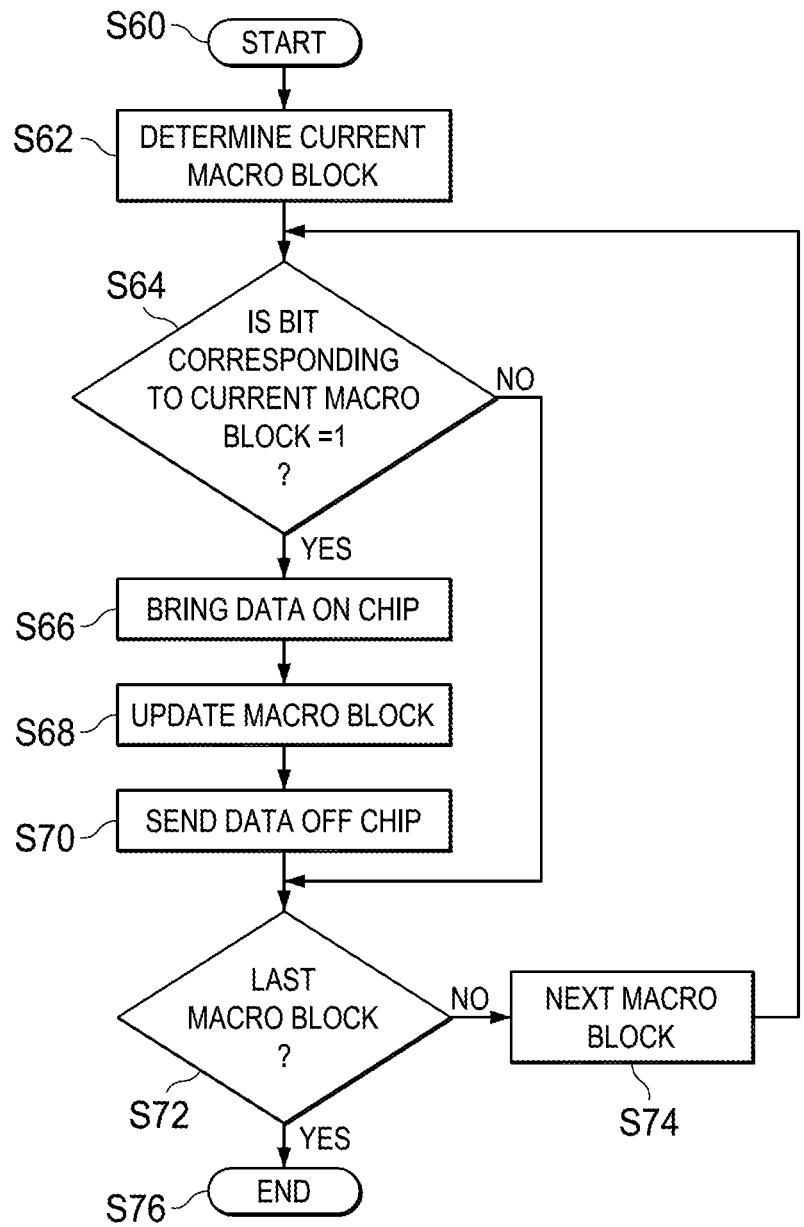
FIG. 5 is a simplified flowchart illustrating a display phase of a video processing system in accordance with one embodiment.

FIG. 5 is a simplified flowchart illustrating the display phase S36 of the video processing system 1 in accordance with one embodiment. The display phase S36 begins at S60. The display phase S36 then proceeds to S62, at which the first macro block of the video plane is determined. In one embodiment, the first macro block is located at the upper left corner of the video plane. In other embodiments, the first macro block is in a different corner of the video plane or is offset from a corner by a predetermined number of columns or rows. The first macro block can also be determined based on, e.g., a vertical blanking interval.

At S64, the system determines whether the attribute of the current macro block is set. If the attribute is embodied as a bit, the system checks whether the bit is, e.g., equal to one. If the bit is set, the system proceeds to S66. If the bit is not set, the system proceeds to S72, discussed later.

At S66, overlay data and video data corresponding to the macro block is brought from an off-chip memory to an on-chip memory, such as a local cache memory. As discussed previously, this on-chip memory can be faster (e.g., have shorter times associated with reading and/or writing data to the memory). In S68, the display interface 18 and the compositor 20 image process (e.g., color convert and blend) the macro block from the overlay and the video macro block, resulting in an updated video macro block. At S70, the updated video macro block is sent from the on-chip memory to the off-chip memory. The display phase then proceeds to S72.

At S72, the system determines whether the last macro block of the video plane has been reached. If the last macro block of the video plane has not been reached, the system advances to the next macro block of the video plane at S74. This next macro block can be the next macro block to the right or, if the current macro block is the last macro block in a row, the leftmost macro block on the next row down. Other methods of iterating through the macro blocks of the graphics plane can be used, as well. For example, the next macro block can be the macro block immediately below the current macro block or, if the current macro block is the last macro block in a column, the topmost macro block in the next column over. It is also possible for the next macro block to be to the left or above the current macro block. The system then returns to the determination at S64.

If the last macro block of the video plane has been reached at S72, then the display phase ends at S76.

In another embodiment, the drawing phase S34 stores, in addition to a variable indicating the identity of the macro blocks in which the primitive is drawn, a second variable indicating the number of macro blocks in which the primitive is drawn. Thus, the determination at S72 can be supplemented or replaced by a determination whether all of the number of macro blocks in which the primitive is drawn, as indicated by the second variable, have been processed. In this manner, it is possible to avoid unnecessary iterations through the remaining macro blocks of a given frame, after processing the last macro block in which the primitive is drawn.

To summarize, during the drawing phase described above, the system marks attributes of macro blocks in which a primitive or a portion of a primitive is drawn. In a particular example, the attributes are marked when the primitive extends across a boundary of a macro block. During the display phase, the attributes of the macro blocks are processed one by one. These attributes identify the video macro blocks to be image processed (e.g., color converted and blended), as well as the macro blocks that are not image processed.

Thus, the system can avoid an expenditure of clock cycles on image processing macro blocks that do not include at least a portion of a primitive. The system can therefore save a significant number of clock cycles by performing image processing only on those macro blocks having their attribute set. Because transferring data between the off-chip memory and the on-chip memory consumes a substantial number of clock cycles, the system can also avoid unnecessary delays by transferring data corresponding to only those macro blocks including a primitive or a portion of a primitive. Thus, the display phase can proceed to a next macro block without an unnecessary data transfer or image processing.

The teachings of this disclosure can be applied in numerous contexts. In addition to the news program context discussed previously, the teachings can be applied, e.g., to automotive products. More specifically, the graphics library can be applied in an automatic driver assistance system. In such a system, a display inside of an automobile displays images captured by cameras placed on the exterior of the automobile. In such a system, when a driver of the automobile changes lanes, the graphics system draw lines indicating that lanes are being shifted. In this instance, the video for the video plane 12 is acquired from the cameras, and the lines indicating the lanes are drawn using the overlay 16. In addition, the system can draw lines to assist the driver when parking the automobile in a lined spot. In this instance, the system draws lines indicating the parking spot using the overlay 16.

The present disclosure can also be applied to the graphical display of a video game. In such an instance, the video game system either renders or replays a video. The graphic system 1 uses an overlay 16 to display, e.g., text in a window superimposed on the video. Such text can pertain to an objective within the game or a current score.

Generally, this disclosure may be applied during drawing and displaying of 2D graphics primitives, such as lines, rectangles, circles, etc. Although the disclosure has focused on a line as an exemplary primitive, the application of this disclosure is not so limited. For example, the primitive can be any of: Line Draw, Poly Line Draw, Polygon, Rectangle Draw, Rectangle Fill, Rectangle Brush, Rounded Rectangle, Circle Draw, Circle Fill, Circle Brush, Circle Brush Fill, Circular Arc, Circular Pie, Circular Pie Fill, Ellipse Draw, Ellipse Fill, Ellipse Brush, Ellipse Brush Fill, Elliptical Arc, BitBlt (block transfer), BitBlt Shrinked, BitBlt Stretched, Text, and Text with Background color. Other primitives, such as a spline curve, can be used, as well.

In exemplary implementations, the initialization, drawing, and displaying operations outlined herein may be implemented by logic encoded in one or more tangible media (e.g., embedded logic provided in an application specific integrated circuit [ASIC], a Programmable Array Logic [PAL], a Generic Array Logic [GAL]). The logic may also be encoded in one or more intangible media (e.g., digital signal processor [DSP] instructions, software [potentially inclusive of object code and source code] to be executed by a processor or any other similar machine, a signal, a propagating wave, etc.).

In some of these instances, a memory element can store data used for the video processing operations described herein. Such a memory element is able to store software, logic, code, or processor instructions that are executed to carry out the activities described in this disclosure. An example of such a memory element is a compact disc ROM (CD-ROM), a digital versatile disc ROM (DVD-ROM), or a Blu-ray Disc (BD). Those memory elements can store, e.g., software that, when executed, performs the operations of this disclosure. The memory elements can also store installation software that installs both the software that actually performs the operations, as well as drivers.

In another instance, the operations of this disclosure are performed by a processor executing software downloaded from a server. In such an instance, the server can store the software in the same form executed by the processor. In another instance, the server stores an executable file that installs the software and drivers, as discussed above with regard to the memory elements. Further, such software or executable file can be spread across multiple servers.

A processor can execute any type of instructions associated with the data to achieve the video processing operations detailed in this disclosure.

In one example, the processor transforms an element or an article (e.g., video data) from one state or thing to another state or thing. In another example, the video processing activities outlined herein may be implemented with fixed logic or programmable logic (e.g., software/computer instructions executed by a processor) and the elements identified herein could be some type of a programmable processor, programmable digital logic (e.g., a field-programmable gate array [FPGA], an erasable programmable read only memory [EPROM], an electrically erasable programmable read only memory [EEPROM], or an application-specific integrated circuit [ASIC]) that includes digital logic, software, code, electronic instructions, or any suitable combination thereof.

The equipment of FIG. 1 may share (or coordinate) certain processing operations. Using a similar rationale, their respective memory elements may store, maintain, and/or update data in any number of possible manners. In a general sense, the arrangements depicted in the preceding FIGURES may be more logical in their representations, whereas a physical architecture may include various permutations/combinations/hybrids of these elements. In one example implementation, the graphic system 1 may include software (e.g., as part of, or in cooperation with, the processing units discussed, such as image processors, EEPROMs, DSPs, FPGAs) to achieve the video processing operations, as outlined in this document. In other embodiments, these features may be provided externally or included in some other device to achieve these functionalities. Alternatively, several elements may include software (or reciprocating software) that can coordinate in order to achieve the video processing, as outlined herein. In still other embodiments, any of the devices of the FIGURES may include any suitable algorithms, hardware, software, components, modules, interfaces, or objects that facilitate these video processing operations.

All of the aforementioned devices may further keep information in any suitable memory element (e.g., RAM, ROM, EPROM, EEPROM, ASIC, etc.), software, hardware, or in any other suitable component, device, element, or object where appropriate and based on particular needs. Similarly, any of the potential processing elements, modules, and machines described in this disclosure should be construed as being encompassed within the broad term 'processor.'

Further, a general purpose processor can be used instead of a DSP. In addition, more than one processor can be used. In the case of multiple processors, the processors can all be programmed identically. Alternatively, each of the multiple processors can be programmed to execute only a portion of the present disclosure, such that the operation of the present disclosure occurs only through cooperation across multiple processors. Other embodiments share the operations differently.

In the discussions of the embodiments above, the buffers, graphics elements and engines, PPIs, cameras, switches, processors, and/or other components can readily be replaced, substituted, or otherwise modified in order to accommodate particular circuitry goals. Moreover, the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals, such as the PPI. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, and so on. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

With the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus, comprising:
a processing unit configured to divide an overlay buffer into a plurality of macro blocks, to draw a graphic primitive object including a plurality of pixels, and to identify one of the plurality of macro blocks upon a determination that the plurality of pixels has crossed a boundary of a plurality of boundaries of the one of the plurality of macro blocks, wherein the processing unit does not check whether the plurality of pixels has crossed an other boundary of the plurality of boundaries, based on a direction in which the graphic primitive object is drawn,
the processing unit further configured to store overlay data and video data corresponding to the one of the plurality of macro blocks in an on-chip cache memory in response to the determination,
the processing unit further configured to perform an image processing of the one of the plurality of macro blocks with a portion of the graphic primitive object including the plurality of pixels,
the processing unit further configured to send an updated video macro block from the on-chip cache memory to an off-chip memory in response to the image processing,
the processing unit further configured to proceed to a next one of the plurality of macro blocks without performing the image processing on a current one of the plurality of macro blocks, if it is determined the plurality of pixels does not cross a boundary of a plurality of boundaries of the current one of the plurality of macro blocks.

2. The apparatus of claim 1, wherein the processing unit is further configured to identify one of the plurality of macro blocks that contains an initial pixel of the graphic primitive object.

3. The apparatus of claim 1, wherein the processing unit is further configured to update a bit corresponding to the one of the plurality of macro blocks in a variable and to perform the image processing on the one of the plurality of macro blocks upon a determination based on the bit in the variable.

4. The apparatus of claim 1, wherein the processing unit is further configured to determine which one of a plurality of macro blocks of a video plane corresponds to the one of the plurality of macro blocks of the overlay buffer prior to the image processing.

5. The apparatus of claim 1, wherein the plurality of pixels begins in an initial one of the plurality of macro blocks, and the processing unit is further configured to identify the initial one of the plurality of macro blocks and to perform the image processing on the initial one of the plurality of macro blocks.

6. The apparatus of claim 1, wherein the graphic primitive object is selected from a group consisting of: a line, a rectangle, a circle, Line Draw, Poly Line Draw, Polygon, Rectangle Draw, Rectangle Fill, Rectangle Brush, Rounded Rectangle, Circle Draw, Circle Fill, Circle Brush, Circle Brush Fill, Circular Arc, Circular Pie, Circular Pie Fill, Ellipse Draw, Ellipse Fill, Ellipse Brush, Ellipse Brush Fill, Elliptical Arc, BitBlt (block transfer), BitBlt Shrinked, and BitBlt Stretched.

7. The apparatus of claim 1, wherein the image processing is defined by at least one of a blending or a color conversion.

8. The apparatus of claim 1, wherein the processing unit is further configured to retrieve the overlay data and the video data corresponding to the one of the plurality of macro blocks in response to the determination.

9. The apparatus of claim 8, wherein the off-chip memory is a read-only memory (ROM), a random access memory (RAM), a hard drive, a compact disc, or a flash memory.

10. A method, comprising:
dividing an overlay buffer into a plurality of macro blocks;
drawing a graphic primitive object including a plurality of pixels;
identifying one of the plurality of macro blocks upon a determination that the plurality of pixels has crossed a boundary of a plurality of boundaries of the one of the plurality of macro blocks, wherein whether the plurality of pixels has crossed an other boundary of the plurality of boundaries is not checked, based on a direction in which the graphic primitive object is drawn;
storing overlay data and video data corresponding to the one of the plurality of macro blocks in an on-chip cache memory in response to the determination;
image processing the one of the plurality of macro blocks with a portion of the graphic primitive object including the plurality of pixels;
sending an updated video macro block from the on-chip cache memory to an off-chip memory in response to the image processing; and
proceeding to a next one of the plurality of macro blocks without performing the image processing on a current one of the plurality of macro blocks, if it is determined the plurality of pixels does not cross a boundary of a plurality of boundaries of the current one of the plurality of macro blocks.

11. The method of claim 10, further comprising:
identifying one of the plurality of macro blocks that contains an initial pixel of the graphic primitive object.

12. The method of claim 10, wherein the identifying includes updating a bit corresponding to the one of the plurality of macro blocks in a variable, and the image processing is performed upon a determination based on the bit in the variable.

13. The method of claim 10, further comprising:
determining which one of a plurality of macro blocks of a video plane corresponds to the one of the plurality of macro blocks of the overlay buffer prior to the image processing.

14. The method of claim 10, further comprising:
retrieving the overlay data and the video data corresponding to the one of the plurality of macro blocks in response to the determination.

15. The method of claim 10, wherein the image processing is defined by at least one of a blending or a color conversion.

16. Logic encoded in one or more non-transitory, tangible media that includes code for execution and, when executed by a processor, operable to perform operations comprising:
dividing an overlay buffer into a plurality of macro blocks;
drawing a graphic primitive object including a plurality of pixels;
identifying one of the plurality of macro blocks upon a determination that the plurality of pixels has crossed a boundary of a plurality of boundaries of the one of the plurality of macro blocks, wherein the processor does not check whether the plurality of pixels has crossed an other boundary of the plurality of boundaries, based on a direction in which the graphic primitive object is drawn;
storing overlay data and video data corresponding to the one of the plurality of macro blocks in an on-chip cache memory in response to the determination;
image processing the one of the plurality of macro blocks with a portion of the graphic primitive object including the plurality of pixels;
sending an updated video macro block from the on-chip cache memory to an off-chip memory in response to the image processing; and
proceeding to a next one of the plurality of macro blocks without performing the image processing on a current one of the plurality of macro blocks, if it is determined the plurality of pixels does not cross a boundary of a plurality of boundaries of the current one of the plurality of macro blocks.

17. The logic of claim 16, wherein the operations further comprise:
identifying one of the plurality of macro blocks that contains an initial pixel of the graphic primitive object.

18. The logic of claim 16, wherein the identifying includes updating a bit corresponding to the one of the plurality of macro blocks in a variable, and the image processing is performed upon a determination based on the bit in the variable.

19. The logic of claim 16, wherein the operations further comprise:
determining which one of a plurality of macro blocks of a video plane corresponds to the one of the plurality of macro blocks of the overlay buffer prior to the image processing.

20. The logic of claim 16, wherein the operations further comprise:
retrieving the overlay data and the video data corresponding to the one of the plurality of macro blocks in response to the determination.

21. The logic of claim 16, wherein the image processing is defined by at least one of a blending or a color conversion.

* * * * *